Jan. 7, 1930.　　　J. L. MOHUN ET AL　　　1,742,870
METAL BOUND WEATHER STRIPPING
Filed March 23, 1928
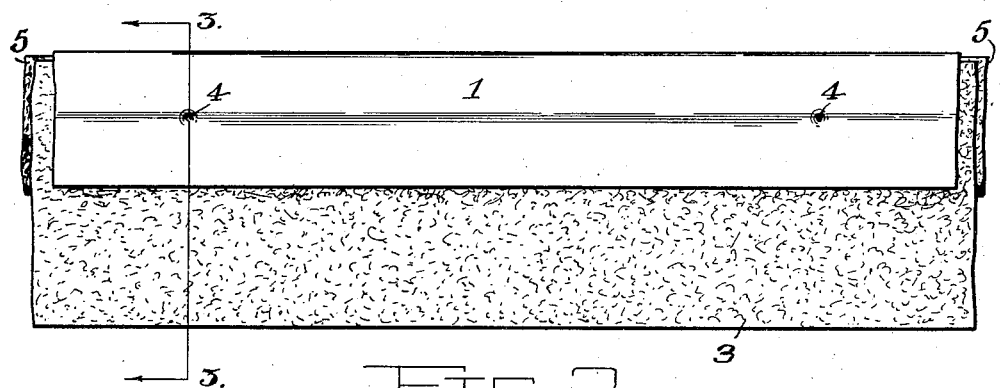
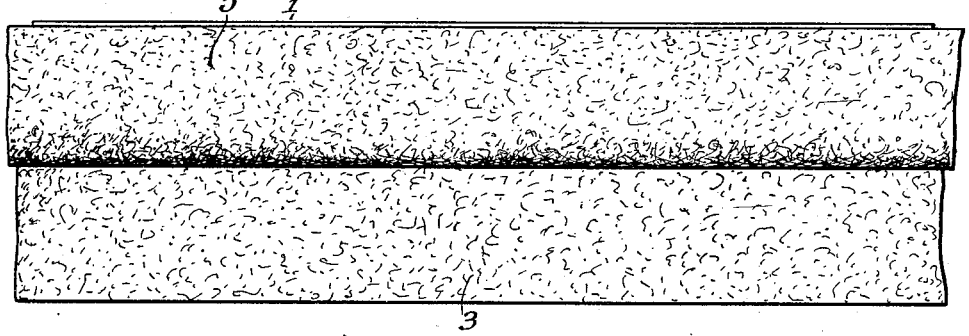
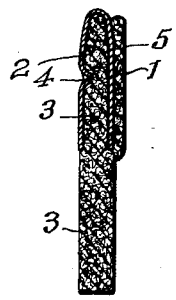
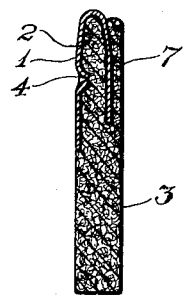
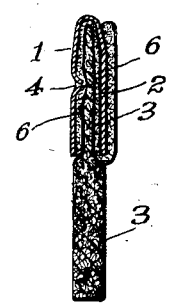
Inventors
John L. Mohun
by Henry Piesch
Attorney Patented Jan. 7, 1930

1,742,870

UNITED STATES PATENT OFFICE

JOHN L. MOHUN AND HENRY PIESCH, OF OMAHA, NEBRASKA, ASSIGNORS TO THE NATIONAL LOCK WASHER COMPANY, OF NEWARK, NEW JERSEY, A CORPORATION OF NEW JERSEY

METAL-BOUND WEATHER STRIPPING

Application filed March 23, 1928. Serial No. 264,087.

This invention relates to metal bound weather strippings, and particularly has reference to an appliance of this nature which is so constructed as to have a double function, namely, to exclude water and dirt from entering at the location where the strip is applied, and also to provide a strip which shall isolate the holder of the main weather stripping from that particular part of a structure to which the device is applied so that dirt and water cannot enter between the device itself and such part.

Referring to the accompanying drawings which form a part of this application

Figure 1 is a face view of the stripping—

Figure 2 is a rear view thereof—

Figure 3 is a section at the line 3—3 of Figure 1—

Figure 4 is a view similar to Figure 3, but showing a modified form of the stripping, and Figure 5 is a sectional view showing a simplified way of forming the stripping.

Similar numerals of reference denote like parts in the several figures of the drawing.

Referring to Figures 1, 2, 3, and 4, this stripping comprises a metal clip or holder 1 which is preferably of a piece of brass or other metallic material that is doubled or bent so as to form a channel 2 and within this channel the main weather stripping 3 is placed and is secured therein by any suitable means, a very expedient and cheap way of doing this being to drive the metal into the strip by means of a prick punch as is illustrated at 4.

This strip 3 extends below the edges of the clip 1, and the latter is secured to any desired part of a structure adjacent the location where the stripping is to be applied.

A portion of the stripping 3 is separated therefrom and bent back so as to provide a strip 5 which extends across the rear face of the clip 1, and when the weather strip is applied for use, this strip 5 will be positioned between the clip and that part of a structure to which such clip is applied, and it will therefore be seen that the clip itself is isolated from such structure.

Or a separate strip 6 may be confined within the clip alongside the main stripping 3, and bent around the rear edge of the clip and faced across the rear surface of the same, so as to provide a strip similar to the strip 5, as shown at Figure 4, and therefore it is immaterial how this subsidiary strip is formed so long as it is confined by the clip.

Referring to Figure 5, a structure is shown in which the main weather stripping 3 is split partway of its width so as to provide a subsidiary stripping 7, and the metal holder encloses the main stripping all but the strip 7, so that it will be seen that the rear of the holder is faced by this strip, and the holder will therefore be isolated from the surface to which it is secured.

By providing a weather stripping with a subsidiary strip of this sort a double protection as against water and dirt is afforded, which is a very desirable feature, since, while the main weather stripping will undoubtedly exclude water and dirt from entering between such stripping and the surface which it contacts, nevertheless unless the means for holding the stripping is isolated from the surface to which it is applied, there is nothing to prevent water and dirt from entering between the latter and such means.

What is claimed is:—

A metal bound weather stripping comprising a metal holder and a weather stripping fixed thereto, and a subsidiary stripping fixed to said holder and covering the rear face of the same, whereby the latter when attached for use will be isolated from the structure to which it is secured.

In testimony whereof we affix our signatures hereto.

JOHN L. MOHUN.
HENRY PIESCH.